United States Patent [19]

Sindeband et al.

[11] Patent Number: 5,379,269
[45] Date of Patent: Jan. 3, 1995

[54] POSITION DETERMINING APPARATUS

[75] Inventors: Seymour J. Sindeband, Pound Ridge, N.Y.; Thomas L. Stone, Beacon Falls, Conn.

[73] Assignee: Science Accessories Corp., Stratford, Conn.

[21] Appl. No.: 3,786

[22] Filed: Jan. 13, 1993

[51] Int. Cl.$^6$ ............................................. G08C 21/00
[52] U.S. Cl. .................... 367/127; 367/907; 178/18
[58] Field of Search ............... 367/907, 127; 178/18, 178/19

[56] References Cited

U.S. PATENT DOCUMENTS

| | | | |
|---|---|---|---|
| 4,012,588 | 3/1977 | Davis et al. | 178/18 |
| 4,357,672 | 11/1982 | Howells et al. | 364/561 |
| 4,488,000 | 12/1984 | Glenn | 178/18 |
| 4,564,928 | 1/1986 | Glenn et al. | 367/117 |
| 4,853,496 | 8/1989 | Taniishi | 367/907 |
| 4,956,824 | 9/1990 | Sindeband et al. | 367/129 |
| 5,142,106 | 8/1992 | Yoshimura et al. | 367/907 |

OTHER PUBLICATIONS

Acoustic Tablet With Lamb Wave, Image Technology Conference, 1980 [In Japanese (6 sheets), with 7 sheet partial translation].

*Primary Examiner*—Daniel T. Pihulic
*Attorney, Agent, or Firm*—Martin M. Novack

[57] ABSTRACT

An apparatus is disclosed for determining the position of a moveable element over the surface of a solid medium. First and second transducer devices are provided and are moveable for placement at selected respective first and second locations on the surface for coupling with said surface. A third transducer device, for coupling with said surface, is mounted with the moveable element. Ultrasonic energy is transmitted, in either direction, between the third transducer device and the first and second transducer devices, the ultrasonic energy travelling through said solid medium. The transit times of the ultrasonic energy propagating, in either direction, between the third transducer device and the first and second transducer devices are determined, the transit times being indicative of the position of the third transducer device with respect to the first and second transducer devices. In a disclosed embodiment, the first and second transducer devices have tips that are feet of a housing and contact the surface over an area that is less than 2 mm$^2$ and preferably, less than 0.5 mm$^2$. A reflection reducer is provided at at least some of the edges of the solid medium.

21 Claims, 5 Drawing Sheets

POSITION DETERMINING APPARATUS

FIELD OF THE INVENTION

This invention relates to graphical data apparatus and, more particularly, to an apparatus and method for determining the position of a movable element.

BACKGROUND OF THE INVENTION

Graphical digitizers are conventionally used to input graphical coordinate information, or the like, to a companion system. In a graphical digitizer, wave energy is typically passed between a movable element, such as a stylus or cursor and transducers located at fixed reference locations. The transit time of the wave energy traveling (in either direction) between the movable element and the reference locations is used in determining the position of the movable element, typically in terms of digital coordinates. A type of graphical digitizer manufactured and sold by the assignee hereof, Science Accessories Corporation, measures the transit time of acoustic or sonic energy propagating through air. One model of this type of digitizer, called a "GRAPHBAR", employs a pair of "point" microphones, having generally circular receptivity patterns, mounted in spaced relation in an elongated generally rectangular housing. The housing or "bar" can be conveniently moved to a position adjacent an area in which the position of a movable element, containing a sound source, is to be digitized. The transit time of sound traveling from the source to each microphone is used, in conjunction with the speed of sound in air and known geometrical relationships, to compute the position of the movable element.

Through-the-air sonic digitizers have various advantages, one of which is the ability to obtain position information without the requirement for any particular type of working surface or space. No special medium is needed to carry signals. The "bar" can be positioned wherever the user desires, for example on a drawing placed on a table, on a piece of plywood, or on other media on which distance, area, or other geometrical measurements are to be made. The region that the microphones generally face is the "working region" of the digitizer.

Although through-the-air sonic digitizers have the indicated important advantages, they have limitations in some types of applications. One such limitation is a consequence of the speed of sound through air, which can limit the dynamic response, for example when the stylus is moved relatively quickly. Another such limitation is susceptibility to air current variations or ambient sonic noise in certain environments. A type of sonic digitizer that is less effected by these limitations is one that operates with the sonic energy, such as ultrasound, propagating through a solid medium such as a plastic or glass data tablet. The speed of ultrasound in such a medium is much higher than the speed of sound in air, so there can be a faster dynamic response. Also, air currents and ambient noise are not significant problems. However, with existing approaches to solid tablet ultrasonic digitizers, there is little flexibility of operation. A tablet surface of solid material, such as plastic or glass, through which the ultrasound can propagate, must be used as the work area, and transducers are connected to specific locations on the solid material. Reference can be made, for example, to U.S. Pat. Nos. 4,488,000 and 4,564,928 wherein an ultrasonic digitizer utilizes a plastic or glass tablet, and strips of polyvinyladine fluoride ("pvdf") are secured to the tablet for sensing ultrasonic energy that propagates in the tablet from the tip of a stylus.

It is among the objects of the present invention to provide a position determining apparatus which can operate with greater flexibility than existing solid tablet digitizers, and which can exhibit improved operation in various applications.

SUMMARY OF THE INVENTION

A form of the present invention utilizes transmission of ultrasonic energy through a solid medium that propagates between transducer devices that have narrow tips for transmitting and/or receiving ultrasound, preferably a shear mode thereof, between locations on the solid medium.

In accordance with an embodiment of the invention, an apparatus is provided for determining the position of a moveable element over the surface of a solid medium. First and second transducer devices are provided and are moveable for placement at selected respective first and second locations on the surface for coupling with said surface. A third transducer device, for coupling with said surface, is mounted with the moveable element. Means are provided for effecting transmission of ultrasonic energy, in either direction, between said third transducer device and said first and second transducer devices, said ultrasonic energy travelling through said solid medium. Means are also provided for determining the transit times of said ultrasonic energy propagating, in either direction, between the third transducer device and the first and second transducer devices, the transit times being indicative of the position of the third transducer device with respect to the first and second transducer devices. In an embodiment hereof, the first and second transducer devices have tips that contact the surface over an area that is less than 2 mm$^2$ and preferably, less than 0.5 mm$^2$.

In a disclosed embodiment, the first and second transducer devices each comprise a piezoelectric transducer coupled with a tapered tip for coupling ultrasonic energy to or from the solid medium. The tips of said first and second transducer devices can be mounted as feet on the bottom of a housing or of separate housings, or can be mounted in clamping mechanisms.

In addition to the advantages of relatively efficient "point to point" communication of shear mode ultrasonic energy in a solid medium, flexibility of positioning is provided in a readily portable equipment.

Applicant has observed that reflections of ultrasonic energy from edges of the solid medium can result in spurious signals at the receiver which may interfere with accurate detection of signal arrival, and thereby degrade digitizer accuracy. In accordance with a further form of the invention, reflection reducing means are provided at at least some of the edges of the solid medium.

Further features and advantages of the invention will become more readily apparent from the following detailed description when taken in conjunction with the accompanying drawings.

DETAILED DESCRIPTION

Figure 1:
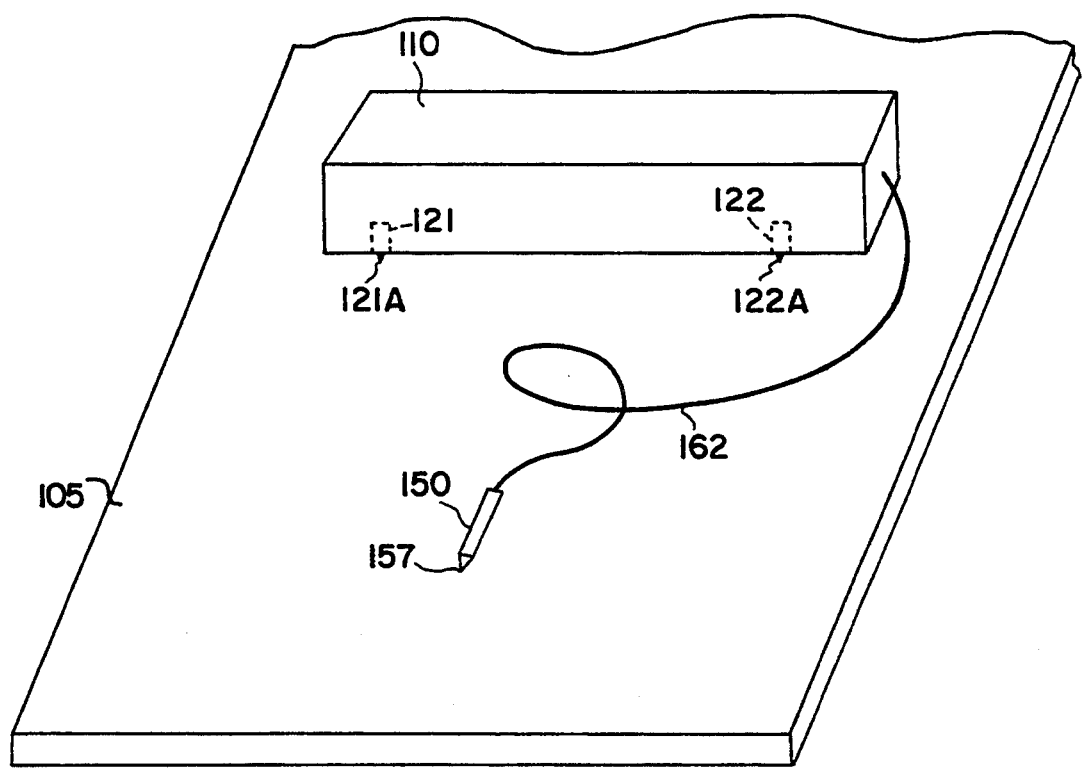
FIG. 1 is a diagram of an apparatus in accordance with an embodiment of the invention.
Figure 2:
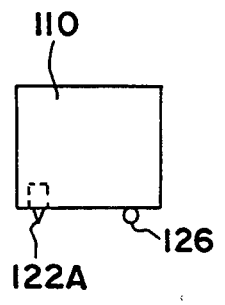
FIG. 2 is a bottom view of the housing of the FIG. 1 apparatus.
Figure 3:
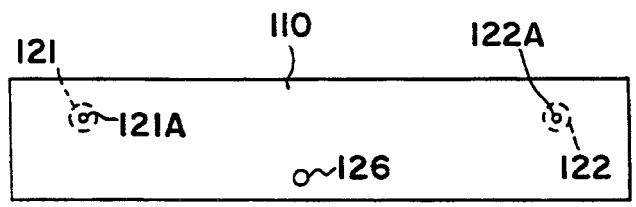
FIG. 3 is a side view of the housing of the FIG. 1 apparatus.

Referring to FIG. 1, there is shown an apparatus in accordance with an embodiment of the invention. The apparatus includes an elongated housing 110 which, in one mode of operation, can be positioned generally adjacent an edge of a region in which the position of a movable element 150 is to be determined. The housing 110, which is further shown in FIGS. 2 and 3, has mounted in the bottom thereof spaced apart transducers devices 121 and 122, which have respective tapered tips 121A and 122A that also serve as two of the feet of the housing 110. A third foot 126, of rubber, is visible in FIGS. 2 and 3. If desired, two or more spaced apart rubber feet can be used. The tips (narrow ends) 121A and 122A of the transducer devices contact or couple to the surface of a solid material 105 which may be, for example, the top of a Formica table, a glass platen or other glass surface, a solid plastic surface, or any other solid surface that will transmit sonic or ultrasonic energy without undue attenuation.

Figure 4:
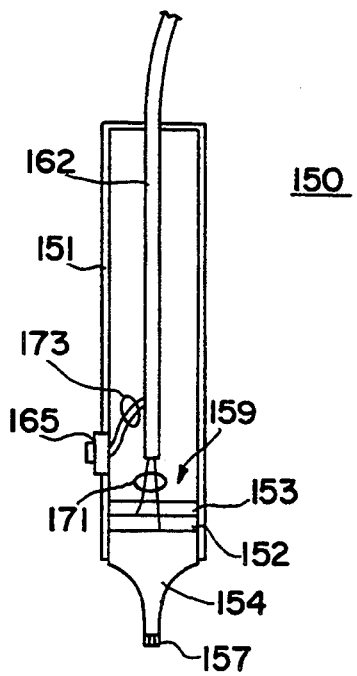
FIG. 4 is a cross-sectional view of a stylus of the FIG. 1 embodiment.

The moveable element 150, which is illustrated as being a stylus in the present embodiment, is moveable over the surface of solid medium 105 and has a tip 157 which contacts the surface and can be used to designate or draw points or lines (sequences of points) on the surface. A cursor or other types of moveable element can alternatively be employed. The stylus, shown in further detail in FIG. 4, includes an elongated pen-like body 151, which may be formed of plastic, that houses a transducer device 159. The device 159 includes a cylindrical body which has a wafer 152 of piezoelectric material, such as lead metaniobate, mounted therein beneath an acoustic absorber 153. The transducer 152 has electrodes formed on opposing sides thereof. A horn-shaped interface/tip 154 is secured to the bottom of the transducer 152, such as with a plastic adhesive. The material of the horn preferably has an acoustic impedance that is between the acoustic impedance of the transducer 152 and the acoustic impedance of the solid medium 105. In one embodiment hereof, an aluminum tip is used. A contact 157, formed of a resilient material such as Teflon, can be employed to facilitate sliding of the tip on the surface of the solid medium 105.

Conductors 171 are coupled through a cable 162 to circuitry in the housing 110 (FIG. 1). The stylus 150 can also be provided with a button that controls a microswitch 165 that the operator can use to designate specified points. The conductors 173, coupled to the microswitch 165, are also carried by the cable 162 to circuitry in the housing 110.

Figure 5:
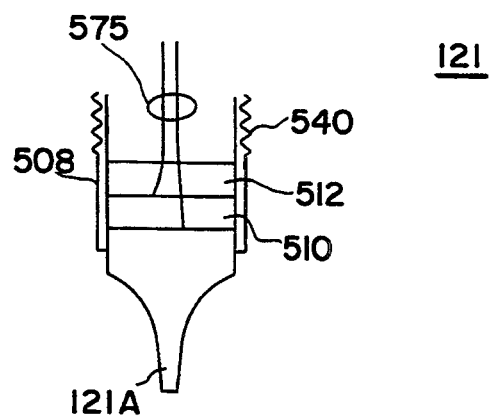
FIG. 5 is a cross-sectional view of a transducer device utilized in the FIG. 1 embodiment and in other embodiments of the invention.

Referring to FIG. 5, there is shown an embodiment of a type of transducer device 121 or 122 that can be utilized in the housing 110 and in other embodiments hereof. The transducer device can have a construction similar to that of the transducer device 159 in the moveable element, as previously described in conjunction with FIG. 4. A cylindrical body 508 contains the piezoelectric disc 510, which has electrodes on opposing surfaces thereof. As above, an acoustic absorber 512 can be mounted over the piezoelectric disc, to serve as a base for the transducer disc and to dampen reflections above the transducer disc, and a horn-shaped interface/tip 121A is secured to the bottom of transducer 510. Again, the material of the horn preferably has an acoustic impedance between the acoustic impedance of the transducer material and the acoustic impedance of the solid medium. The tip contacts the surface over an area that is less than 2 mm$^2$, and, preferably, less than 0.5 mm$^2$. Conductors 575 couple the transducer electrodes to circuitry in the housing 110. The body 508 can be provided with threading, as shown at 540, which can engage suitable threading in a recess in the bottom of housing 110 for mounting therein. A resilient mounting can alternatively be used to provide a degree of mechanical isolation of the transducer device from the housing.

In one mode of operation, an electrical signal is applied across the stylus transducer's electrodes. The resultant vibration of the piezoelectric transducer element travels down the horn to the tip thereof, and the vertical component of the tip's motion results in establishment of a shear wave in the solid medium. In this mode of operation, the shear mode energy in the solid medium is received at the transducer devices 121 and 122 in the housing 110. The shear mode energy in the solid medium causes a vibration at the tip of the horn of each device, which travels up the horn and results in a vibration at the piezoelectric transducer, which, in turn, causes an electrical potential across the electrodes thereof. The travel time in the solid medium is measured, and since the speed of the ultrasonic shear wave in the solid medium is known (or can be determined empirically), the distance between the tip of the moveable element and the tips of the transducer devices in the housing 110 can be computed. From the two distances, the coordinates of the tip of the moveable element can be determined (see, for example, U.S. Pat. Nos. 4,012,588 and 4,357,672). As is known in the art, so-called "reverse mode" transmission through a solid medium can alternatively be employed, and reverse mode is applicable to the various embodiments hereof. In the embodiment of FIG. 1, for example, the ultrasonic energy can be transmitted (e.g. alternately, or at different frequencies) from the transducer devices in the housing 110, and received at the transducer device in the moveable element.

Figure 6:
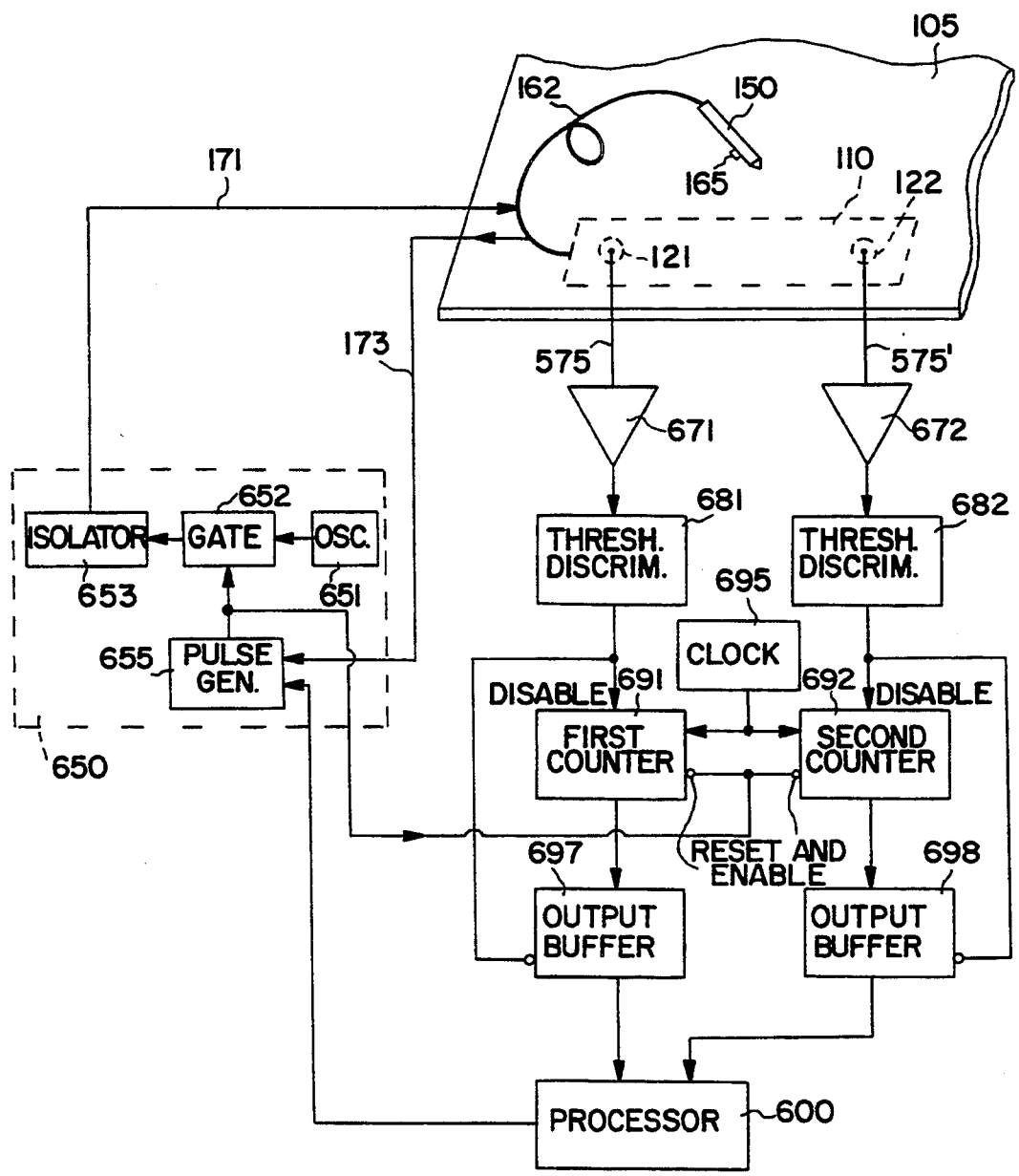
FIG. 6 is a block diagram of circuitry of the FIG. 1 embodiment and which can be used in other embodiments of the invention.

FIG. 6 shows a block diagram of circuitry, some or all of which can be contained in the housing 110. Typically, as with prior digitizers, a companion system such as a processor, represented at 600, can be used to receive and process the positional information for any desired purpose and, if desired, to trigger operation of the digitizer apparatus and to control when it operates.

The conductors in cable 162 and are coupled to energizing circuitry shown in dashed enclosure 650. The output of a high frequency oscillator 651 is coupled, via gate 652 and isolator 653, to the transducer 152 in stylus 150. The gate 652, which may be a solid state switch, receives pulses from the pulse generator 655. Pulse generation can be periodic, and/or can be initialized and/or terminated, for example by a signal from processor 600 and/or from the switch 165, via conductors 173.

The outputs of the transducer devices 121 and 122 are coupled via conductors 575 and 575' to amplifiers 671 and 672, respectively. The outputs of amplifiers 671 and 672 are respectively coupled to threshold discriminator circuits 681 and 682, which may be of a type known in the art, that are used to detect the first arrival of the ultrasonic signal at the transducers.

The pulse generator signal which is operative to enable the gate 652 is also applied to the reset and enable terminals of a first counter 691 and a second counter 692. Clock pulses from a basic clock 695 are counted by the counters 691 and 692 upon being enabled. The output of threshold discriminators 681 and 682 are respectively coupled to the disable terminals of first counter 691 and second counter 692. The outputs of these counters are respectively coupled to output buffers 697 and 698, which are enabled to read out the counter values by the same signal which disables the counters. The buffer outputs are typically coupled to a companion system, such as processor 600 which may be, for example, part of a personal computer system. Other circuitry and electronic processing techniques can alternatively be employed.

In operation, each time the leading edge of a pulse from pulse generator 655 allows the gate to pass an energizing signal to the transducer 152 in stylus 150, the first counter 691 and the second counter 692 are enabled to start counting clock pulses from the clock 695. Upon respective arrival of the ultrasonic energy at the transducer devices 121 and 122, the counters 691 and 692 are respectively disabled and their counts are caused to be read out via output buffers 697 and 698. The counts respectively represent the distance between the stylus tip and the tip 121A of the transducer device 121, and the distance between the stylus tip and the tip 122A of the transducer device 122. These distances determine the position of the stylus tip and can be used, in a known geometrical relationships to determine, for example, x, y rectangular coordinates of the stylus tip position with respect to a coordinate system defined with respect to the stationary transducer devices. Reference can be made, for example, to the above-referenced U.S. Pat. Nos. 4,012,588 and 4,357,672.

Figure 7:
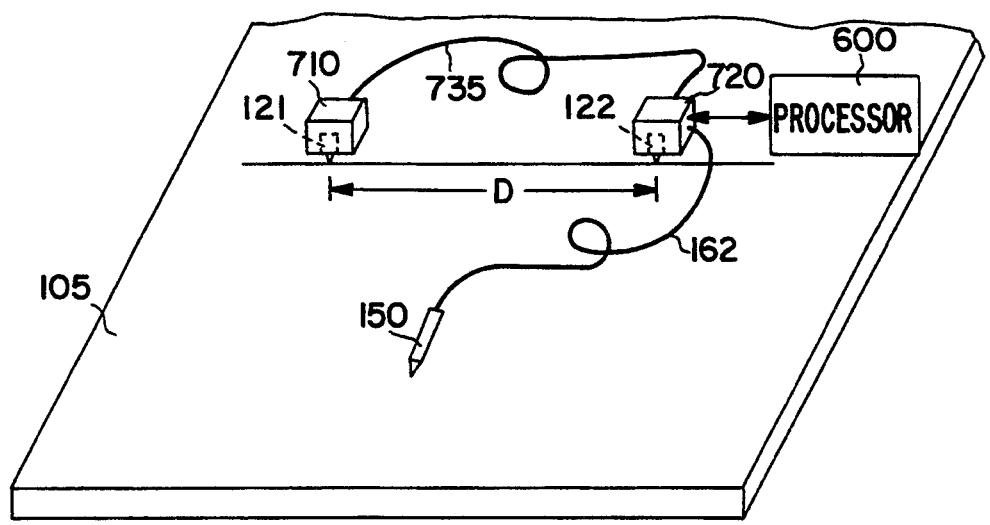
FIG. 7 illustrates a further embodiment of the invention that utilizes separate housings.

Referring to FIG. 7, there is shown an embodiment of the invention wherein two separate housings, 710 and 720, are used and each contains at least one transducer device. The housings respectively contain the transducer devices 121 and 122, as previously described. Each housing can also have a plurality of rubber feet (not visible). The embodiment of FIG. 7 has a cable 735 providing electrical communication between the two housings. The stylus cable 162 is coupled with housing 720, and the housing 720 is coupled with processor 600. The circuitry of the FIG. 1 embodiment (as shown in FIG. 6) can be utilized herein, and can be located, for example, in either housing or in both housings. With the present embodiment, the working area is not limited by the length of the bar, as in the FIG. 1 embodiment. Alternatively, each of the units and/or the stylus can have direct electrical connection with the processor 600. Wireless communication could also be used.

When separate housings are employed, it is necessary to know the locations of the transducer tips 121A and 122A. They can, for example, be positioned at known or measured locations. In the illustration of FIG. 7, the transducer device tips are positioned along a predetermined straight line, a measured distance D apart. Various types of calibration can also be used to precisely determine the distance between transducers (see such as U.S. Pat. No. 4,956,824). For example, the moveable element can be used in a pre-operation calibration routine by placing it at (or a known distance from) the position or planned position of a transducer device 121 or 122. The transducer devices 121 and/or 122 could also be adapted to transmit as well as receive, for calibration purposes.

Figure 8:
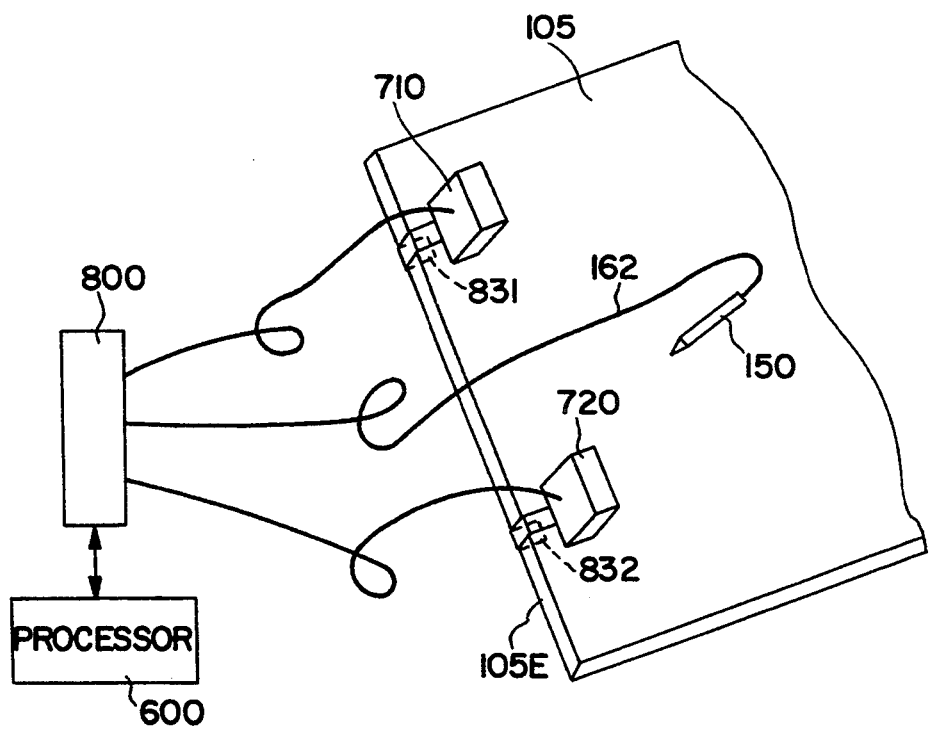
FIG. 8 illustrates a further embodiment of the invention that utilizes clamp-on transducer devices.

Referring to FIG. 8, there is shown a further embodiment of the invention which can be employed to advantage when there is easy access to an edge 105E of the solid medium 105. In this embodiment the transducer devices 121 and 122 (not visible) are respectively mounted in housings 710 and 720, as in the previous embodiment, and the housings have respective clamping assemblies 831 and 832 that are adapted to clamp to an edge of the solid medium so that the tips 121A and 122A are pressed against the surface of the solid medium. In the FIG. 8 embodiment the transducer devices and the stylus 150 are coupled by cables to a housing 800 that can contain the previously described electronics and/or, if desired, with processor 600. Considerations of transducer placement and/or calibration are similar to those described in conjunction with FIG. 7.

In some applications of the various embodiments of the invention, a paper having markings to be digitized can be placed on the solid medium, and coupling of ultrasonic energy to and/or from the solid medium can be achieved through the paper. If the paper is not unduly thick, sufficient energy will be coupled between the transducer device and the solid medium. For example, in one mode of use, both the moveable element transducer device and the temporarily fixed transducer devices may be on paper. However, in most instances where paper is being used, the temporarily fixed transducers may be located beyond the edge of the paper, so that only the transducer device in the moveable element will need to couple ultrasonic energy through the paper to and/or from the solid medium.

Figure 9:
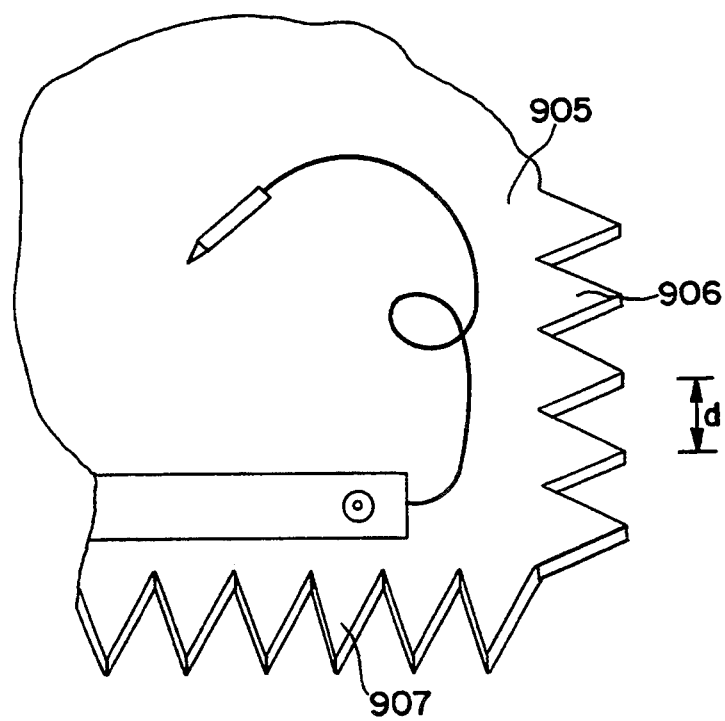
FIGS. 9 and 10 illustrate improvements in accordance with a further form of the invention which is useful in reducing undesired reflections of ultrasonic energy.

Applicant has observed that reflections of ultrasonic energy from edges of the solid medium can result in spurious signals at the receiver which may interfere with accurate detection of signal arrival, and thereby degrade digitizer accuracy. In accordance with a feature of the invention, reflection reducing means are provided at at least some of the edges of the solid medium and, preferably, at all the edges thereof. FIG. 9 illustrates an embodiment of reflection reducing means on the edges of a solid medium 905 being used for transmission of ultrasonic energy for coordinate position determination. A pattern of teeth has been found to be effective. In the illustrated embodiment, the edges 906,907 of the solid medium have a sawtooth shape. Other shapes of teeth can be used. The teeth prevent direct reflections to the receivers, and multiple reflections generally arrive too late to cause problems. Also, each reflection has an associated attenuation that tends to attenuate the multiple reflected energy. Preferably, the spacing d between adjacent teeth should be at least as large as the wavelength at the center frequency of the ultrasonic energy in the solid medium. If the spacing is too small, the energy will tend to reflect more directly.

Figure 10:
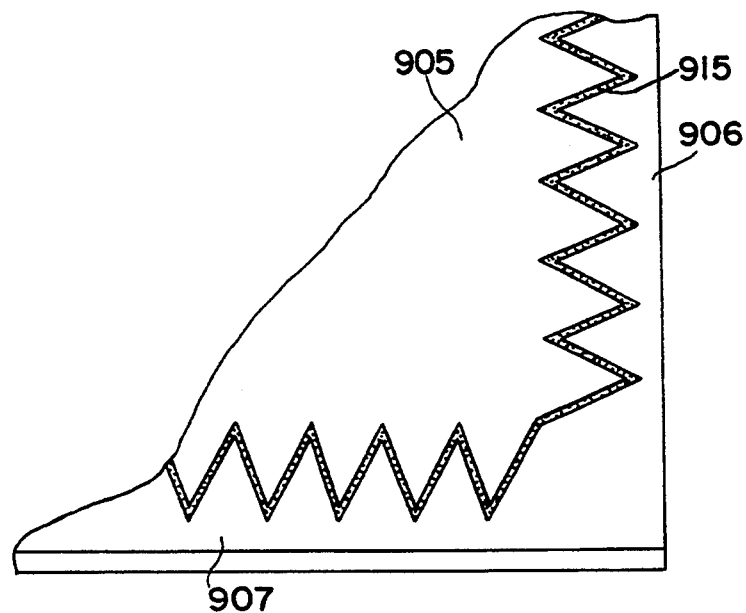

If desired, the pattern of teeth can be formed as a recess in the material which will define an edge thereof, as illustrated in FIG. 10. The recess can extend through most of the thickness of the solid medium and, if desired, can be filled with a material that absorbs the sonic energy, as represented by the reference numeral 915. The material should preferably be lossy and have an acoustic impedance close to that of the solid medium to minimize reflections. For example, when the solid medium is glass, a tungsten-filled epoxy can be used.

The invention has been described with reference to particular preferred embodiments, but variations within the spirit and scope of the invention will occur to those skilled in the art. For example, it will be understood that other transducer device configurations can be utilized to transmit and/or receive ultrasonic energy to and/or from the solid medium via a tip.

We claim:

1. In an apparatus for determining the position of a moveable element over the top surface of a solid medium tablet, which operates by transmitting ultrasonic energy between locations on the solid medium and determining the transit time of said ultrasonic energy in travelling between locations, the improvement comprising a solid medium tablet having a top surface and an edge pattern with a multiplicity of teeth formed therein.

2. Apparatus as defined by claim 1, wherein said teeth are in a sawtooth pattern.

3. Apparatus as defined by claim 1, wherein the spacing between said teeth is at least as large as the wavelength at the center frequency of said ultrasonic energy in said solid medium.

4. Apparatus for determining the position of a moveable element over the surface of a solid medium, comprising:
    a housing;
    first and second transducer devices that are moveable for placement at selected respective first and second locations on said surface for coupling with said surface, said first and second transducer devices having tips which are mounted as feet on the bottom of said housing;
    a third transducer device, for coupling with said surface, mounted with said moveable element;
    means for effecting transmission of ultrasonic energy, in either direction, between said third transducer device and said first and second transducer devices, said ultrasonic energy travelling through said solid medium; and
    means for determining the transit times of said ultrasonic energy propagating, in either direction, between said third transducer device and said first and second transducer devices, said transit times being indicative of the position of said third transducer device with respect to said first and second transducer devices.

5. Apparatus as defined by claim 4, wherein said first and second transducer devices have tips that contact said surface over an area that is less than 2 mm$^2$.

6. Apparatus as defined by claim 5, wherein said third transducer device has a tip that contacts said surface over an area that is less than 2 mm$^2$.

7. Apparatus as defined by claim 4, wherein said first and second transducer devices each comprise a piezoelectric transducer coupled with a tapered tip for coupling ultrasonic energy to or from said solid medium.

8. Apparatus as defined by claim 5, wherein said first and second transducer devices each comprise a piezoelectric transducer coupled with a tapered tip for coupling ultrasonic energy to or from said solid medium.

9. Apparatus for determining the position of a moveable element over the surface of a solid medium, comprising:
    first and second housings;
    first and second transducer devices that are moveable for placement at selected respective first and second locations on said surface for coupling with said surface, said first transducer device having a tip which is mounted as a foot of a first housing, and said second transducer device having a tip which is mounted as a foot of a second housing.;
    a third transducer device, for coupling with said surface, mounted with said moveable element;
    means for effecting transmission of ultrasonic energy, in either direction, between said third transducer device and said first and second transducer devices, said ultrasonic energy travelling through said solid medium; and
    means for determining the transit times of said ultrasonic energy propagating, in either direction, between said third transducer device and said first and second transducer devices, said transit times being indicative of the position of said third transducer device with respect to said first and second transducer devices.

10. Apparatus as defined by claim 9, wherein said first and second transducer devices have tips that contact said surface over an area that is less than 2 mm$^2$.

11. Apparatus as defined by claim 10, wherein said third transducer device has a tip that contacts said surface over an area that is less than 2 mm$^2$.

12. Apparatus as defined by claim 9, wherein said first and second transducer devices each comprise a piezoelectric transducer coupled with a tapered tip for coupling ultrasonic energy to or from said solid medium.

13. Apparatus as defined by claim 10, wherein said first and second transducer devices each comprise a piezoelectric transducer coupled with a tapered tip for coupling ultrasonic energy to or from said solid medium.

14. Apparatus for determining the position of a moveable element over the surface of a solid medium, comprising:
    a housing;
    first and second transducer devices that are moveable for placement at selected respective first and second locations on said surface for coupling with said surface, said first and second transducer devices having tips which are mounted as feet on the bottom of said housing;
    a third transducer device, for coupling with said surface, mounted with said moveable element;
    means for effecting transmission of ultrasonic shear mode energy from said third transducer device for travel through said solid medium to said first and second transducer devices; and
    means for determining the transit times of said ultrasonic energy propagating from said third transducer device to each of said first and second transducer devices, said transit times being indicative of the position of said third transducer device with respect to said first and second transducer devices.

15. Apparatus as defined by claim 14, wherein said first and second transducer devices have tips that contact said surface over an area that is less than 2 mm$^2$.

16. Apparatus as defined by claim 14, wherein said first and second transducer devices each comprise a piezoelectric transducer coupled with a tapered tip for coupling ultrasonic energy to said solid medium.

17. Apparatus as defined by claim 15, wherein said first and second transducer devices each comprise a piezoelectric transducer coupled with a tapered tip for coupling ultrasonic energy to said solid medium.

18. Apparatus for determining the position of a moveable element over the surface of a solid medium, comprising:

first and second housings;

first and second transducer devices that are moveable for placement at selected respective first and second locations on said surface for coupling with said surface, said first transducer device having a tip which is mounted as a foot of a first housing, and said second transducer device having a tip which is mounted as a foot of a second housing;

a third transducer device, for coupling with said surface, mounted with said moveable element;

means for effecting transmission of ultrasonic shear mode energy from said third transducer device for travel through said solid medium to said first and second transducer devices; and means for determining the transit times of said ultrasonic energy propagating from said third transducer device to each of said first and second transducer devices, said transit times being indicative of the position of said third transducer device with respect to said first and second transducer devices.

19. Apparatus as defined by claim 18, wherein said first and second transducer devices have tips that contact said surface over an area that is less than 2 mm$^2$.

20. Apparatus as defined by claim 18, wherein said first and second transducer devices each comprise a piezoelectric transducer coupled with a tapered tip for coupling ultrasonic energy to said solid medium.

21. Apparatus as defined by claim 19, wherein said first and second transducer devices each comprise a piezoelectric transducer coupled with a tapered tip for coupling ultrasonic energy to said solid medium.

* * * * *